United States Patent
Wyville et al.

(10) Patent No.: US 12,040,843 B2
(45) Date of Patent: Jul. 16, 2024

(54) DISTORTION DETECTION WITH MULTIPLE ANTENNAS

(71) Applicant: Telefonaktiebolaget LM Ericsson (publ), Stockholm (SE)

(72) Inventors: Mark Wyville, Ottawa (CA); Pierre-Andre Laporte, Gatineau (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 265 days.

(21) Appl. No.: 17/610,225

(22) PCT Filed: Jul. 17, 2019

(86) PCT No.: PCT/IB2019/056113
§ 371 (c)(1),
(2) Date: Nov. 10, 2021

(87) PCT Pub. No.: WO2021/009548
PCT Pub. Date: Jan. 21, 2021

(65) Prior Publication Data
US 2022/0224423 A1    Jul. 14, 2022

(51) Int. Cl.
*H04B 17/10*    (2015.01)
*H04B 17/29*    (2015.01)

(52) U.S. Cl.
CPC ........... *H04B 17/103* (2015.01); *H04B 17/29* (2015.01)

(58) Field of Classification Search
CPC .............................. H04B 17/103; H04B 17/29
See application file for complete search history.

(56) References Cited

U.S. PATENT DOCUMENTS

| | | |
|---|---|---|
| 8,983,454 B2 | 3/2015 | Bevan et al. |
| 10,440,660 B2 | 10/2019 | Laporte et al. |

(Continued)

FOREIGN PATENT DOCUMENTS

| | | |
|---|---|---|
| KR | 10-2018-0053810 A | 5/2018 |
| WO | 2008/004987 A1 | 1/2008 |

(Continued)

OTHER PUBLICATIONS

International Search Report and Written Opinion of the International Searching Authority dated Apr. 1, 2020 issued in PCT Application No. PCT/IB2019/056113, consisting of 12 pages.

(Continued)

*Primary Examiner* — Sam K Ahn
*Assistant Examiner* — Amneet Singh
(74) *Attorney, Agent, or Firm* — Weisberg I.P. Law, P.A.

(57) ABSTRACT

A method in a network node and an apparatus for determining passive intermodulation (PIM) characteristics at the network node are provided. According to one aspect, a method includes capturing signals from each of at least one antenna port at a first time and a second time. The method includes determining a first covariance matrix based on signals captured at the first time. The method also includes determining a second covariance matrix based on signals captured at the second time. The method further includes determining a difference matrix, the difference matrix being based on a difference between the first and second covariance matrices, the difference matrix corresponding to changes in PIM between the first time and the second time.

21 Claims, 7 Drawing Sheets

(56) References Cited

U.S. PATENT DOCUMENTS 10,581,473 B2     3/2020    Wyville et al.
2010/0015935 A1*   1/2010    Zeng .................... H04B 17/345
                                                               455/206
2014/0378067 A1* 12/2014    Au ...................... H04B 17/0085
                                                               455/67.11

FOREIGN PATENT DOCUMENTS

WO     WO-2012038126 A1 *   3/2012       ......... H04B 17/0085
WO         2017/157461 A1      9/2017

OTHER PUBLICATIONS

International Preliminary Report on Patentability dated Jan. 18, 2022 issued in PCT Application No. PCT/IB2019/056113, consisting of 8 pages.

* cited by examiner

DISTORTION DETECTION WITH MULTIPLE ANTENNAS

CROSS-REFERENCE TO RELATED APPLICATION

This application is a Submission Under 35 U.S.C. § 371 for U.S. National Stage Patent Application of International Application Number: PCT/IB2019/056113, filed Jul. 17, 2019 entitled "DISTORTION DETECTION WITH MULTIPLE ANTENNAS," the entirety of which is incorporated herein by reference.

TECHNICAL FIELD

Wireless communication and in particular, to distortion detection with multiple antennas.

BACKGROUND

Passive Inter-Modulation (PIM) is an important concern for cellular operators as more downlink channels are being transmitted from the cellular radio sites. As used herein, PIM refers to interference generated by two or more carrier frequencies being exposed to non-linear mixing. The resulting signal will contain additional, unwanted frequencies or intermodulation products. As the "Passive" portion of the name implies, this non-linear mixing does not involve active devices and is frequently caused by the metallic materials and workmanship of the interconnects and other passive components in the system. Thus, one example of PIM sources includes imperfect metal connections. To add to the challenge, the newly added radio channels belong to a rising number of radio bands which increases the odds of having PIM that desensitizes the uplink receivers.

A growing number of cellular operators now require that the presence of PIM in the uplink channels be reported by radio equipment so that PIM mitigation measures can then be taken.

Some PIM-detection (PIM-D) techniques have been reported in the literature. For example, one approach suggests measuring the noise floor in the uplink channels during transmission time intervals (TTIs) where no uplink (UL) traffic is scheduled and in the guard bands of the uplink channels when uplink traffic is present. However, this approach can miss some PIM occurrences during the site operation since 1) PIM may not be present during the uplink TTIs where no traffic is scheduled and 2) PIM may not appear in the UL channel guard bands. Another approach introduces a method where the signal envelope for each of the downlink (DL) carriers is correlated with the uplink signal envelope. However, in this approach, the PIM problems involving DL carriers that are external to the radio, such as the ones that are transmitted by the same operator in another radio band with different equipment, may go unnoticed. In addition, the PIM levels may be so low with respect to the UL noise floor that the envelope correlation may not detect any anomaly.

In another approach, a non-linear model of the PIM is generated from the transmitted DL signals. The PIM model is then correlated with the uplink channels. This approach has at least the following drawbacks.

This technique does not scale well when the number of DL antennas involved in creating the PIM increases as in massive-multiple-input-multiple-output (massive MIMO) systems. The number of non-linear terms that are required to create the PIM model increases exponentially with the number of DL antennas.

The PIM model must be tailored to suit a specific carrier configuration with non-linear terms that match the intermodulation band which creates the PIM problem. Therefore, the PIM model must be adjusted for every carrier configuration. This makes the solution hard to scale to various deployment scenarios.

The PIM model must be tuned to the exact frequency offset with respect to the UL channel. In the situation where there are multiple victim UL channels, each of them requires the PIM model to be tuned to a different frequency offset and may also require a different PIM model.

The non-linear order of the model must closely match that of the PIM, which may fluctuate over time.

Oversampling is needed when generating the PIM model to avoid aliasing, which increases the implementation cost.

SUMMARY

Some embodiments advantageously provide a method and system for distortion detection with multiple antennas.

There may be two time durations where 1) the UL power due to wireless device (WD) traffic, interference and noise is not expected to vary, and 2) a DL covariance matrix is expected to vary. The DL covariance matrix change could be due to a change in power (e.g., physical resource block (PRB) loading in 3rd Generation Partnership Project (3GPP) Long Term Evolution (LTE)), or a change in the precoder. In LTE, these two time durations could correspond to two symbols in the same transmission time interval (TTI). The DL variation could be due to the absence/presence of cell specific reference signals (CRS) in certain symbols, or the difference between the control symbols and the data symbols. The change in the UL covariance matrix is determined. The spatial structure of the matrix that represents the change in UL corresponds to the spatial structure of the PIM signal. In other words, the decomposition of this matrix will result in vectors, where each vector corresponds to the channel between the PIM source(s) and the base station antenna ports.

Some advantages of some embodiments may include one or more of the following:
1. Does not require modelling the non-linear behavior of the PIM source;
2. Does not require knowledge of the DL signals for all embodiments;
3. Detects PIM external to the antenna;
4. Works in the presence of WD traffic, WD interference and noise; and
5. Can provide spatial information about PIM source(s).

According to one aspect, a method in a network node for determining passive intermodulation, PIM, characteristics at the network node is provided. The method includes capturing signals from each of at least one antenna port at a first time and a second time. The method also includes determining a first covariance matrix based on signals captured at the first time. Further, the method includes determining a second covariance matrix based on signals captured at the second time. Yet further, the method includes determining a difference matrix, the difference matrix being based on a difference between the first and second covariance matrices, the difference matrix corresponding to changes in PIM between the first time and the second time.

According to this aspect, in some embodiments, the method further includes decomposing, at least in part, the difference matrix to generate eigenvectors and eigenvalues, the eigenvectors representing a PIM subspace, each eigenvalue corresponding to a change in PIM in a direction indicated by a corresponding eigenvector. In some embodiments, the difference matrix has submatrices and the decomposing is of at least a portion of the difference matrix. In some embodiments, the portion of the difference matrix to be decomposed is determined by a comparison of elements of the difference matrix to at least one threshold. In some embodiments, the method includes averaging a plurality of difference covariance matrices. In some embodiments, of the difference matrices are weighted, at least one of the weights being based at least in part on diagonal elements of the difference covariance matrix. In some embodiments, a measurement of a signal of the signals is prescreened to determine whether the measurement is used to determine the difference covariance matrix. In some embodiments, the prescreening is based on whether a sum of diagonal elements of the difference matrix exceeds a first threshold. In some embodiments, the prescreening is based on whether a difference between a sum of diagonal elements of the first covariance matrix and a sum of diagonal elements of the second covariance matrix exceeds a second threshold. In some embodiments, the prescreening is based on whether a sum of diagonal elements of the first and second covariance matrices does not exceed a third threshold.

According to another aspect, an apparatus is configured to determine passive intermodulation, PIM, characteristics at the network node. The apparatus includes processing circuitry configured to capture signals from each of at least one antenna port at a first time and a second time. The processing circuitry is further configured to determine a first covariance matrix based on signals captured at the first time. The processing circuitry is configured to determine a second covariance matrix based on signals captured at the second time. The processing circuitry is further configured to determine a difference matrix, the difference matrix being based on a difference between the first and second covariance matrices, the difference matrix corresponding to changes in PIM between the first time and the second time.

According to this aspect, in some embodiments, the processing circuitry 48 is further configured to decompose, at least in part, the difference matrix to generate eigenvectors and eigenvalues, the eigenvectors representing a PIM subspace, each eigenvalue corresponding to a change in PIM in a direction indicated by a corresponding eigenvector. In some embodiments, the difference matrix has submatrices and decomposing is of at least a portion of the difference matrix. In some embodiments, the portion of the difference matrix to be decomposed is determined by a comparison of elements of the difference matrix to at least one threshold. the processing circuitry is further configured to average a plurality of difference matrices. averages of the difference matrices are weighted, at least one of the weights being based at least in part on diagonal elements of the difference covariance matrix. a measurement of a signal of the signals is prescreened to determine whether the measurement is used to determine the difference matrix. the prescreening is based on whether a sum of diagonal elements of the difference matrix exceeds a first threshold. the prescreening is based on whether a difference between a sum of diagonal elements of the first covariance matrix and a sum of diagonal elements of the second covariance matrix exceeds a second threshold. In some embodiments, the prescreening is based on whether a sum of diagonal elements of the first and second covariance matrices does not exceed a third threshold.

According to yet another aspect, a method in a network node for determining passive intermodulation, PIM, characteristics at the network node is provided. The method includes capturing signals from each of at least one antenna port at a first time and a second time, an antenna port being one of a physical antenna port and a logical antenna port. The method also includes determining a first covariance matrix based on signals captured at the first time. The method also includes determining a second covariance matrix based on signals captured at the second time, the first and second covariance matrices comprising correlation terms, each correlation term being based at least in part on an expected value of a product of signals received from two antenna ports. The method further includes determining a difference matrix, the difference matrix being based on a difference between the first and second covariance matrices, the difference matrix corresponding to changes in PIM between the first time and the second time. The method further includes decomposing at least part of the difference matrix to generate eigenvectors and eigenvalues, the eigenvectors representing a PIM subspace, each eigenvalue corresponding to a change in PIM in a direction indicated by a corresponding eigenvector.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
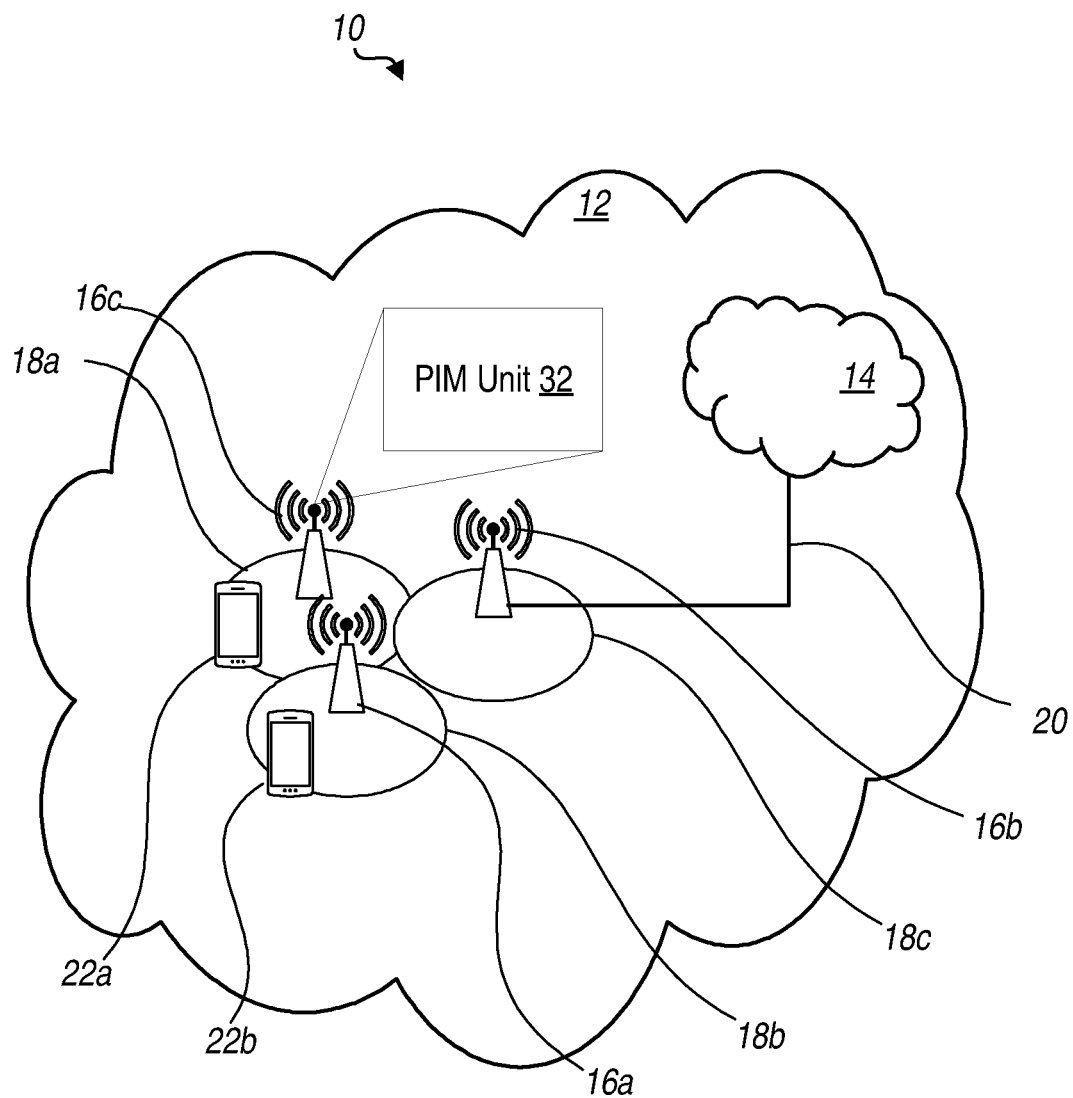
FIG. 1 is a block diagram of a wireless communication network.

Before describing in detail exemplary embodiments, it is noted that the embodiments reside primarily in combinations of apparatus components and processing steps related to distortion detection with multiple antennas. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR) (also known as "5G"), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method in a network node and an apparatus for determining passive intermodulation (PIM) characteristics at the network node are provided. According to one aspect, a method may include capturing signals from each of at least one antenna port at a first time and a second time. The method includes determining a first covariance matrix based on signals captured at the first time. The method also includes determining a second covariance matrix based on signals captured at the second time. The method further includes determining a difference matrix, the difference matrix being based on a difference between the first and second covariance matrices, the difference matrix corresponding to changes in PIM between the first time and the second time. As used herein, the term "time," e.g., first time and second time, can refer to an instantaneous point in time or a time interval.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a PIM unit 32 which is configured to determine a difference matrix, the difference matrix being based on a difference between first and second covariance matrices, the difference matrix corresponding to changes in PIM between the first time and the second time.

Example implementations, in accordance with an embodiment, of the WD 22, network node 16 and host computer 24 discussed in the preceding paragraphs will now be described with reference to FIG. 2.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include PIM unit 32 configured to process a difference matrix corresponding to PIM changes over time.

The communication system 10 further includes the WD 22 already referred to. The WD 22 may have hardware 60 that may include a radio interface 62 configured to set up and maintain a wireless connection 46 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
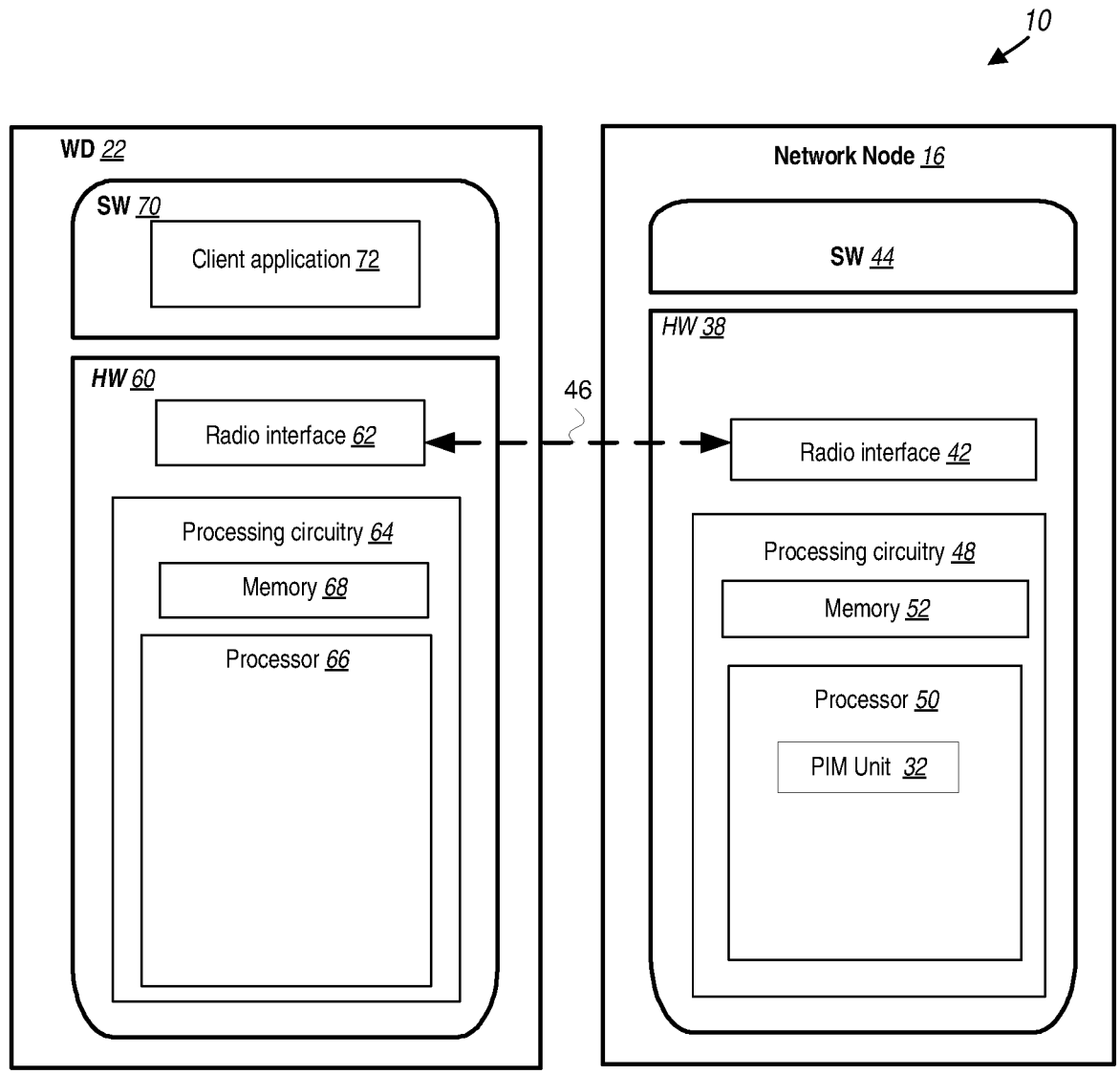
FIG. 2 is a block diagram of a network node and a wireless device (WD)

In some embodiments, the inner workings of the network node 16 and WD 22 may be as shown in FIG. 2 and independently, the surrounding network topology may be that of FIG. 1.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as PIM unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
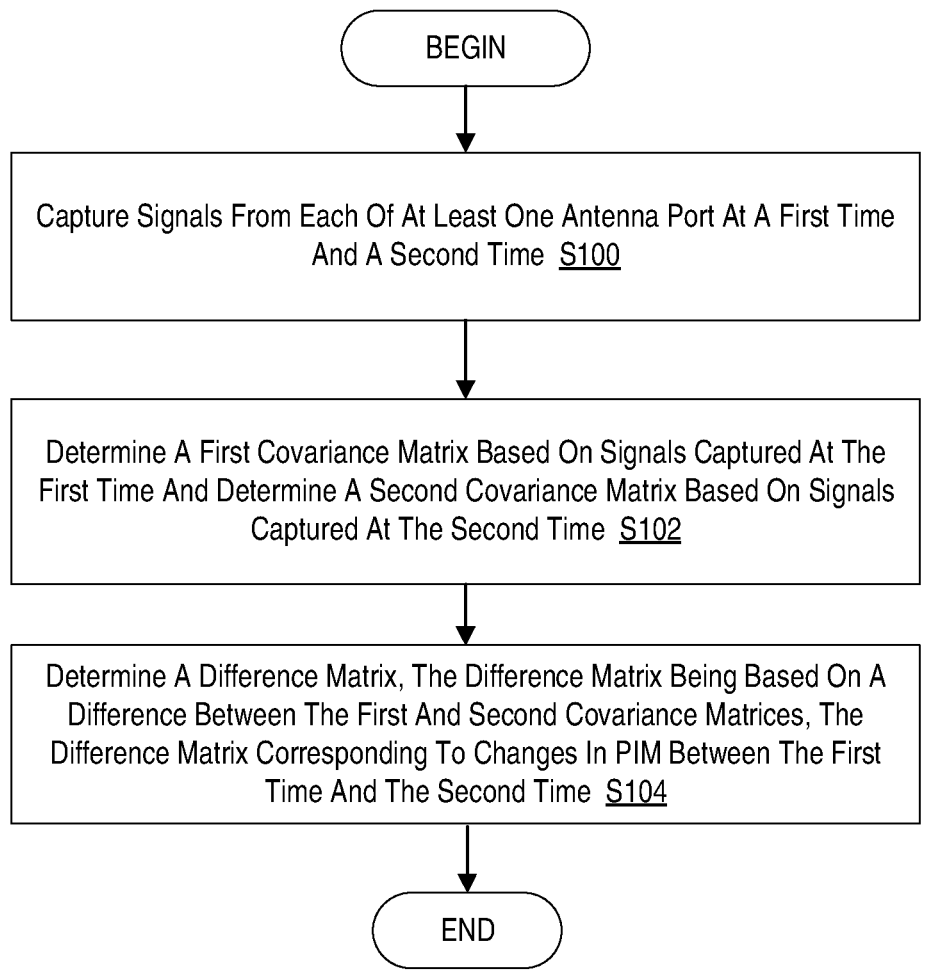
FIG. 3 is a flowchart of an exemplary process for PIM characterization.

FIG. 3 is a flowchart of an exemplary process in a network node 16 for determining PIM characteristics at the network node 16. One or more blocks described herein may be performed by one or more elements of network node 16 such as by one or more of processing circuitry 48 (including the PIM unit 32), processor 50, and/or radio interface 42. Network node 16 such as via processing circuitry 48 and/or processor 50 and/or radio interface 62 is configured to capture signals from each of at least one antenna port at a first time and a second time (Block S100). The process also includes determining a first covariance matrix based on signals captured at the first time and also includes determining a second covariance matrix based on signals captured at the second time (Block S102). The process further includes determining a difference matrix, the difference matrix being based on a difference between the first and second covariance matrices, the difference matrix corresponding to changes in PIM between the first time and the second time (Block S104).

Figure 4:
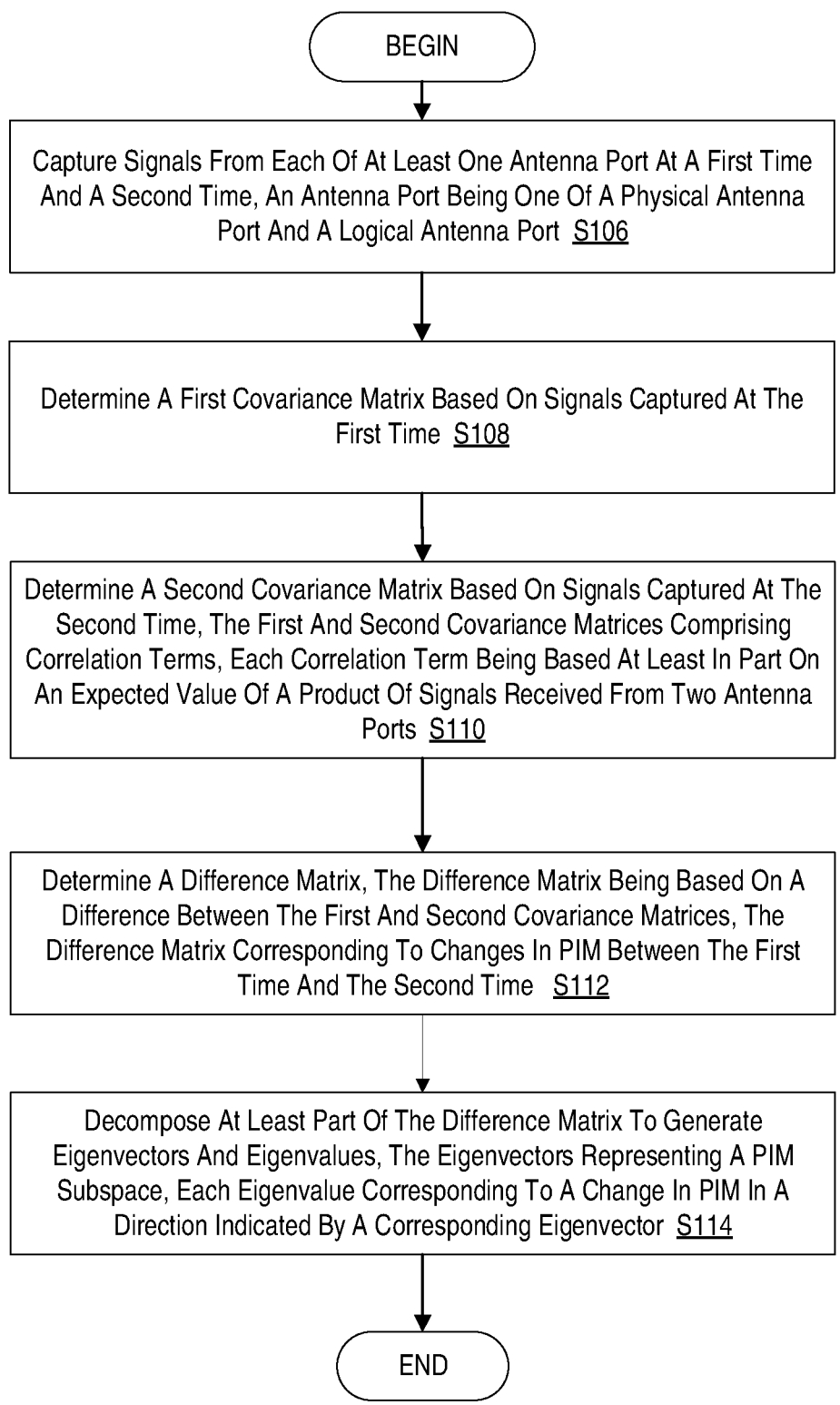
FIG. 4 is a flowchart of an alternative exemplary process for PIM characterization.

FIG. 4 is a flowchart of an alternative exemplary process that may be performed by the processing circuitry 48, and more particularly with the aid of the PIM unit 32, according to some embodiments of the present disclosure. The process includes capturing signals from each of at least one antenna port at a first time and a second time, an antenna port being one of a physical antenna port and a logical antenna port (Block S106). The process includes determining a first covariance matrix based on signals captured at the first time (Block S108). The process also includes determining a second covariance matrix based on signals captured at the second time, the first and second covariance matrices comprising correlation terms, each correlation term being based at least in part on an expected value of a product of signals received from two antenna ports (Block S110). The process further includes determining a difference matrix, the difference matrix being based on a difference between the first and second covariance matrices, the difference matrix corresponding to changes in PIM between the first time and the second time (Block S112). The process also includes decomposing at least part of the difference matrix to generate eigenvectors and eigenvalues, the eigenvectors representing a PIM subspace, each eigenvalue corresponding to a change in PIM in a direction indicated by a corresponding eigenvector (Block S114).

Having described the general process flow of arrangements of the disclosure and having provided examples of hardware and software arrangements for implementing the processes and functions of the disclosure, the sections below provide details and examples of arrangements for distortion detection with multiple antennas.

Figure 5:
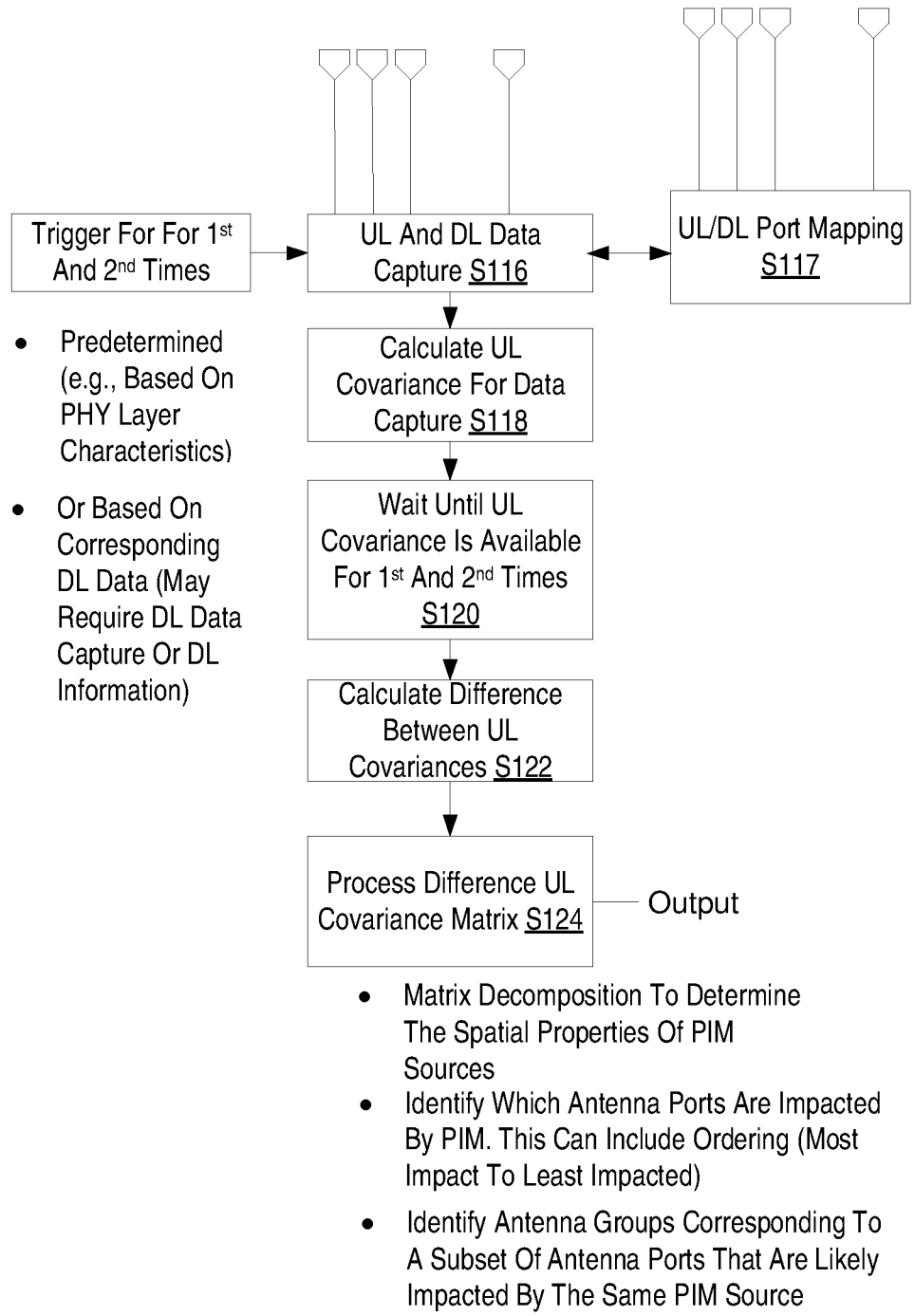
FIG. 5 is a flowchart of a process for PIM characterization using logical antenna port mapping.

In some embodiments, with reference to FIG. 5, the following steps may be performed by, for example, processing circuitry 48, including PIM unit 32 in some embodiments, and/or by other processing circuitry separate from the network node 16.

1. Make at least 1 UL measurement (Block S116), where each UL measurement includes:
    a. Capturing the raw data (commonly referred to as IQ data) during 2 time periods from 1 or more antenna ports (simultaneous captures across the antenna ports). These can be from physical antenna ports, or logical ports (physical antenna ports can be mapped to logical antenna ports with a matrix transform—see right side of FIG. 5, Block S117).

The time domain signals for each antenna port ($r_i$) are shown below in the presence of multiple interferers $r_{int}$, multiple WD's carrying desired WD 22 traffic $r_{ue}$, and PIM from potentially multiple PIM sources $r_{pim}$. The channel between each of these signal sources and antenna port i may be denoted by $h_{src,i}$ (src=int, WD 22 or pim). The interference term here also includes noise.

$$r_1 = \sum h_{int,1} r_{int} + \sum h_{ue,1} r_{ue} + \sum h_{pim,1} r_{pim}$$
$$r_2 = \sum h_{int,2} r_{int} + \sum h_{ue,2} r_{ue} + \sum h_{pim,2} r_{pim}$$
$$\vdots$$
$$r_N = \sum h_{int,N} r_{int} + \sum h_{ue,N} r_{ue} + \sum h_{pim,N} r_{pim}$$

b. Between the 2 time periods the covariance matrix should change for the DL (requirement #1). A change in the DL transmit covariance matrix can result in a change in the DL transmit power hitting a PIM source. In one embodiment, the DL transmit covariance matrix can be measured across multiple time periods to find the two time periods with a sufficient difference. In another embodiment, the DL transmit covariance may not be measured as it is expected to vary between specific time periods in a wireless physical layer protocol. One example would be between symbols with and without CRS in LTE within the same TTI.

c. Between the two time periods (Block S120), the UL covariance matrix may be expected not to change for the components of the UL transmit covariance that are due to WD UL traffic, WD interference and noise (requirement #2). For this to be true the scheduled UL TTI's in a network should not start or stop between the start time of the $1^{st}$ time period and the stop time of the $2^{nd}$ time period.

The UL covariance values between each pair of antennas are the elements of the UL covariance matrix. (See Block S118). The expression below corresponds to the covariance between the received signals in antenna ports i and j for a single time period.

$$E[(r_i - E[r_i])(r_j - E[r_j])^*] = E[r_i r_j^*]$$

It is typical for $E[r_i]=0$. The remainder of this disclosure will use this typical value—although this is not necessary for all embodiments. In other words, embodiments described herein may be extended to non-zero $E[r_i]$.

d. Any change in the UL covariance matrix between two time periods may be assumed to be due to a changing level of PIM—which changes due to the change in the DL covariance matrix.

For each i, j pair in the UL covariance matrix there will be the correlation terms for the first and the second time intervals. The difference of the result for the two intervals removes the interference and WD 22 traffic contributions to the UL covariance. The channels are assumed to remain static between the two durations.

During the first time period the covariance terms are:

$$E[r_i r_j^*]_{1st}$$

During the second time period the correlation terms are:

$$E[r_i r_j^*]_{2nd}$$

The difference between the covariance terms between the first and the second time periods is:

$$E[r_i r_j^*]_{1st} - E[r_i r_j^*]_{2nd}$$

(Block S122) It may be assumed that channels do not vary between the two intervals, which may correspond to some OFDM symbols. The UL interference power and desired WD 22 power do not vary between the first and the second symbols: $|r_{int,1st}|^2 = |r_{int,2nd}|^2$ and $|r_{int,1st}|^2 = |r_{int,2nd}|^2$, which may be based on requirement #2.

The following signals are assumed to be independent:
  Interferers are independent of other interferers: $r_{int}$ with other $r_{int}$;
  Desired WD 22 traffic may be independent of other desired WD 22 traffic;
  All interferers are independent of desired WD 22 traffic;
  All interferers are independent of the PIM signals; and
  All desired WD 22 traffic may be independent of the PIM signals.

The difference between the covariance terms (Block S122) between the first and second time periods becomes independent of the interference and desired WD 22 traffic in the UL:

$$E[r_i r_j^*]_{1st} - E[r_i r_j^*]_{2nd} = E\left[\left(\sum h_{pim,i} r_{pim,1st}\right)\left(\sum h_{pim,j}^* r_{pim,1st}^*\right)\right] - E\left[\left(\sum h_{pim,i} r_{pim,2nd}\right)\left(\sum h_{pim,j}^* r_{pim,2nd}^*\right)\right]$$

2. It is noted that the beamforming weights that maximize the PIM power in the receiver are very close to the solution that maximizes the difference in PIM power between the two time periods. There can be a scaling coefficient that differs between the two beamforming solutions.
In other words, the dominant vectors from the decomposition of the difference-covariance matrix (which is defined below) will represent the weighting coefficients that maximize the PIM signal (i.e., are the conjugate of the channel from the PIM source to the receive branches).
  a. The beamforming weights are sufficient to describe the spatial properties of the PIM source. An example of a spatial property may be where an external PIM source is located relatively close to one of the antennas. Another example is when antenna branches have an in-line PIM source. Another would be where the PIM signal is picked up by multiple antenna ports with unique relative phase and amplitude offsets between the ports.
  b. For each UL measurement, the change in UL covariance may be calculated between the two time periods. This change is denoted by difference-covariance.
    i. The difference-covariance may be used to isolate PIM from the other signals in the UL (WD, interference and noise). This may be done without knowledge of the other signals in the UL. The following equation may be used to isolate PIM from UL interference and WD traffic. It corresponds to the difference between the covariance matrices ($R_{\Delta pim}$) during the first and the second time periods. This difference-covariance matrix is:

$$R_{\Delta pim} = \begin{bmatrix} E[(r_1 r_1^*)_{1st}] - E[(r_1 r_1^*)_{2nd}] & E[(r_2 r_1^*)_{1st}] - E[(r_2 r_1^*)_{2nd}] & \cdots & E[(r_N r_1^*)_{1st}] - E[(r_N r_1^*)_{2nd}] \\ E[(r_1 r_2^*)_{1st}] - E[(r_1 r_2^*)_{2nd}] & E[(r_2 r_2^*)_{1st}] - E[(r_2 r_2^*)_{2nd}] & & \vdots \\ \vdots & \vdots & & \vdots \\ E[(r_1 r_N^*)_{1st}] - E[(r_1 r_N^*)_{2nd}] & \cdots & & E[(r_N r_N^*)_{1st}] - E[(r_N r_N^*)_{2nd}] \end{bmatrix}$$

3. In one embodiment there is a decomposition (Block S124) of each difference-covariance matrix. An example would be an eigen-based decomposition. The eigenvectors would represent the PIM-subspace in the UL. The eigenvalues would correspond to the change in PIM in the direction of the corresponding eigenvector across the two time periods.
  a. In some embodiments, only a portion of the difference-covariance matrix may be decomposed. The elements of the difference-covariance may be used to determine which sub-matrix should be decomposed.
    i. A threshold could be applied to the elements of a difference-covariance matrix to determine which elements should be included in each subset.
4. In another embodiment the difference-covariance matrices are averaged together. One example would be a weighted average, where the weights are calculated from the diagonal elements of the corresponding difference-covariance matrix.
  a. The weighted difference-covariance matrix can then be decomposed as discussed in 3.
5. The difference covariance matrix may not always be decomposable. In this case, it may be sufficient just to use the values of the difference-covariance matrix (or averaged version) to determine which branches are impacted by PIM, and to make some determination about whether the PIM is in-line or external.
6. A full decomposition of the difference-covariance matrix (or averaged difference-covariance matrix) may not be required if only some of the dominant directions are desired to be known. An example is the power method, which is an iterative technique used to find the dominant eigenvector. The dominant eigenvector would be useful when the PIM spatial properties can be mostly represented by a single vector (instead of a matrix).
7. Measurements can be prescreened to determine whether they should be used or discarded. Some examples of the prescreening are:
   a. The sum of the diagonal of the difference-covariance matrix must exceed a first threshold;
   b. The difference of the sum of the diagonal of the DL covariance matrix between the first and the second time periods should exceed a $2^{nd}$ threshold. Since this prescreening may be used on the DL, it could alternatively be used to trigger an UL measurement; and
   c. The sum of the diagonal of both of the first and the second UL covariance matrices should not exceed a $3^{rd}$ threshold.
8. Each calculation of the difference-covariance matrix can be used on its own. However, it may be advantageous to combine multiple results to improve the accuracy of the solutions.
   a. Multiple difference-covariance matrix results could be combined to improve the accuracy. This is a repeat of step 4a.
   b. Multiple spatial decomposition results could be combined to improve the accuracy:
      i. After several spatial decomposition results are available—they could be compared to determine the spatial decomposition that is most consistent across multiple measurements. A weighting of the results could apply here as the PIM to 'other-signal' ratio could be different for each measurement.
9. Although methods have been described for detecting PIM, these methods may also detect non-linear behavior from other sources of distortion. Other sources could include power amplifier distortion leaking into the receiver, or components in the receiver.
10. The output of this function, that is, the non-linear distortion detection algorithm for multiple antennas, could be:
   a. Spatial decomposition of the PIM source(s). This output may be useful do identify the location of the PIM source, or be used as an input to additional antenna port combining functions.
      i. This decomposition can be the full decomposition of the difference covariance matrix. Alternatively, it could just provide the dominant spatial vectors of the decomposition.
      ii. The spatial decomposition could be provided considering all antenna ports together. Alternatively, the decomposition could be provided on each subset of the antenna ports (denoted by antenna groups).
   b. Identification of which antenna ports have PIM present. The diagonal of the difference covariance matrix could provide a measure of the PIM on each antenna port. This information could be passed to other functions that are related to PIM management (e.g., detect, report, mitigate PIM, etc.).
   c. Identify which antenna ports belong in a subset. The suitability for antenna ports to be within the same antenna group can be based on the non-diagonal terms of the difference correlation matrix. This could then be used to reduce the complexity of the algorithm in further runs.
      i. As a non-limiting example of one state of one embodiment, if the absolute value of the difference covariance matrix is as follows, it may be concluded that ports 1 and 2 have been hit by the same PIM source and that ports 2 and 3 are substantially PIM free:

$$|\Delta R| = \begin{matrix} 0.80 & 0.79 & 0.09 & 0.12 \\ 0.79 & 0.83 & 0.08 & 0.05 \\ 0.09 & 0.08 & 0.06 & 0.07 \\ 0.12 & 0.05 & 0.07 & 0.09 \end{matrix}$$

11. The spatial properties may be determined by taking the difference between two covariance matrices. There are other covariance comparison techniques that can be used to determine the spatial properties of a non-stationary process in a stationary process.
   a. One example would be to project the covariance matrix of the first time period onto the covariance matrix of the second time period to estimate the spatial properties of the signal that has unchanging 2nd order statistics between the two time intervals. The spatial representation of these signals could then be removed from the covariance matrix of the second time period. This should leave one with an estimate of the spatial representation of the signal that had changing 2nd order statistics between the two time intervals.

Figure 6:
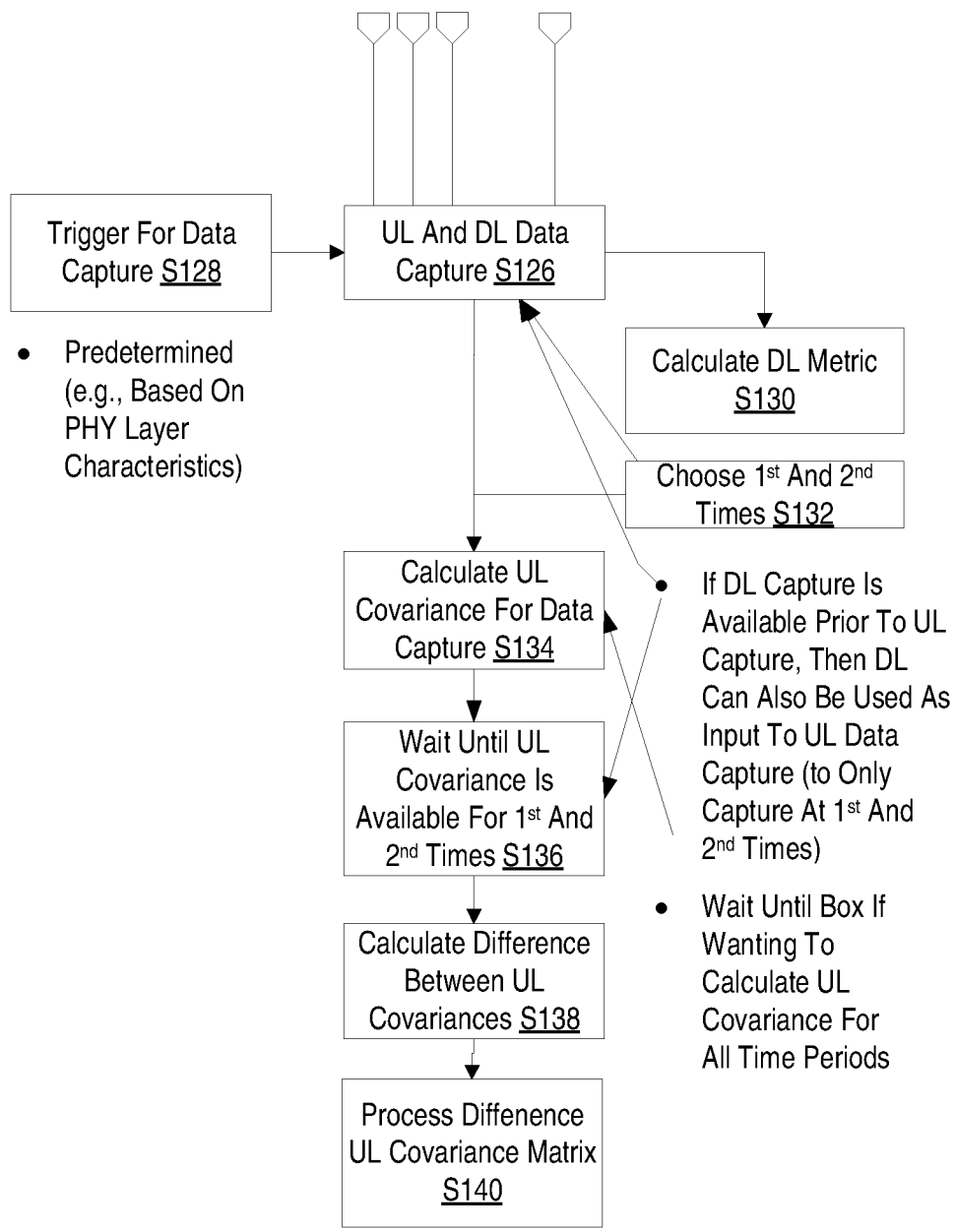
FIG. 6 is a flowchart of a process for PIM characterization using a downlink metric.

FIG. 6 shows an embodiment where the two time periods are chosen from a set of time periods that is greater than 2. The measured data (Block S126) (DL and/or UL) can be used to choose the two time periods, by ensuring that the DL (or UL) power variation exceeds a certain threshold between the two symbols. The predetermined trigger (Block S128) may still be used to ensure that the set of time periods captured is not expected to have a variation in UL power due to desired WD 22 traffic and interference. Optionally, a downlink metric such as covariance or power may be calculated (Block S130), which serves as a basis for choosing the first and the second intervals (Block S132). Then, UL covariance matrices are obtained from the captured data (Block S134). To do this, there may be a waiting period between the first and the second time intervals (Block S136). The difference between the UL covariance matrices is calculated (Block S138) and processed (Block S140). Note that the trigger for data capture (Block S128) may be predetermined and may be based on physical layer characteristics. Note also that if DL capture is available prior to uplink captures, then it could also be used as input to UL data capture (to only capture first and second symbols). The result of the step of choosing first and second time intervals (Block S132) may be input to step S136, in the event it is desirable to calculate the UL covariance for all time periods.

Figure 7:
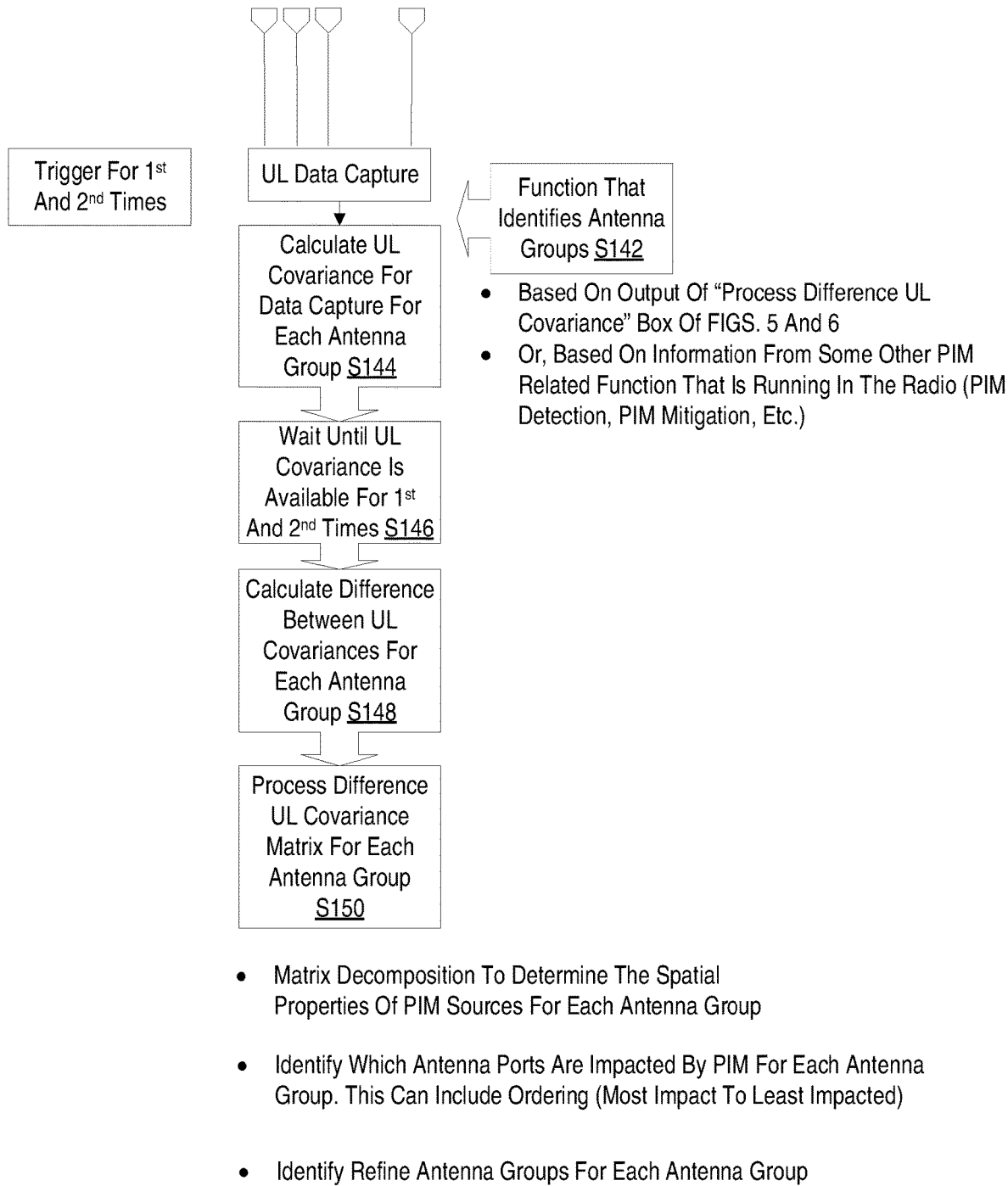
FIG. 7 is a flowchart of a process for PIM characterization based on antenna groups.

FIG. 7 shows an example embodiment where the processing by the processing circuitry 48 is performed for subsets of the antenna ports (where each subset is an antenna group). Note that some or all of this processing and the processing described below may be performed by the PIM unit 32 of processor 50. In other words, in some embodiments, the processor 50 may be configured, such as by software, firmware, etc., to in all or part, perform the functions herein ascribed to the PIM unit 32. The new function could be input to any of the vertically stacked blocks. It may reduce the processing of all the following blocks where data/processing is split into subsets. A function that identifies antenna groups (Block S142) may be based on the difference matrix discussed above or based on information from some other PIM related function that is running, such as PIM detection, PIM mitigation, etc. In Step S144, the UL covariance based on captured data is calculated for each antenna group. To do this, there may be a waiting period between first and the second time intervals (Block S146). The difference between the UL covariance matrices is calculated for each antenna group (Block S148) and processed for each antenna group (Block S150). The processing of each antenna group (Block S150) may include matrix decomposition to determine the spatial properties of PIM sources for each antenna group. The processing may include identifying which antenna ports are impacted by the PIM for each antenna group. These ports may be ordered from most impacted to least impacted. The processing may include identifying and/or refining the antenna groups.

Note that the capture of data from which the covariance matrices are obtained may be captured near an antenna. The remaining steps of the methods described herein may be performed away from the antenna and away from the network node as desired or needed. For example, the difference covariance matrix calculation and decomposition can be remote from the antennas. As another example, the decomposition could be moved to another location away from the antennas. In this example, the difference covariance matrices can be sent from near the antennas to the remote location.

Thus, appropriate time periods are chosen such that the only variation in power across the 2 UL periods is due to a change in PIM power—which is due to a change in the amount of power hitting the PIM source. The change in UL covariance matrix between the time periods is determined, and the properties of this 'difference' matrix are used to identify the spatial properties of the PIM source(s).

According to one aspect, a method in a network node 16 for determining passive intermodulation, PIM, characteristics at the network node 16 is provided. The method includes capturing signals from each of at least one antenna port at a first time and a second time. The method also includes determining a first covariance matrix based on signals captured at the first time. Further, the method includes determining a second covariance matrix based on signals captured at the second time. Yet further, the method includes determining a difference matrix, the difference matrix being based on a difference between the first and second covariance matrices, the difference matrix corresponding to changes in PIM between the first time and the second time.

According to this aspect, in some embodiments, the method further includes decomposing, at least in part, the difference matrix to generate eigenvectors and eigenvalues, the eigenvectors representing a PIM subspace, each eigenvalue corresponding to a change in PIM in a direction indicated by a corresponding eigenvector. In some embodiments, the difference matrix has submatrices and the decomposing is of at least a portion of the difference matrix. In some embodiments, the portion of the difference matrix to be decomposed is determined by a comparison of elements of the difference matrix to at least one threshold. In some embodiments, the method includes averaging a plurality of difference covariance matrices. In some embodiments, of the difference matrices are weighted, at least one of the weights being based at least in part on diagonal elements of the difference covariance matrix. In some embodiments, a measurement of a signal of the signals is prescreened to determine whether the measurement is used to determine the difference covariance matrix. In some embodiments, the prescreening is based on whether a sum of diagonal elements of the difference matrix exceeds a first threshold. In some embodiments, the prescreening is based on whether a difference between a sum of diagonal elements of the first covariance matrix and a sum of diagonal elements of the second covariance matrix exceeds a second threshold. In some embodiments, the prescreening is based on whether a sum of diagonal elements of the first and second covariance matrices does not exceed a third threshold.

According to another aspect, an apparatus is configured to determine passive intermodulation, PIM, characteristics at the network node 16. The apparatus includes processing circuitry 48 configured to capture signals from each of at least one antenna port at a first time and a second time. The processing circuitry 48 is further configured to determine a first covariance matrix based on signals captured at the first time. The processing circuitry 48 is configured to determine a second covariance matrix based on signals captured at the second time. The processing circuitry 48 is further configured to determine a difference matrix, the difference matrix being based on a difference between the first and second covariance matrices, the difference matrix corresponding to changes in PIM between the first time and the second time.

According to this aspect, in some embodiments, the processing circuitry 48 is further configured to decompose, at least in part, the difference matrix to generate eigenvectors and eigenvalues, the eigenvectors representing a PIM subspace, each eigenvalue corresponding to a change in PIM in a direction indicated by a corresponding eigenvector. In some embodiments, the difference matrix has submatrices and decomposing is of at least a portion of the difference matrix. In some embodiments, the portion of the difference matrix to be decomposed is determined by a comparison of elements of the difference matrix to at least one threshold. the processing circuitry is further configured to average a plurality of difference matrices. averages of the difference matrices are weighted, at least one of the weights being based at least in part on diagonal elements of the difference covariance matrix. a measurement of a signal of the signals is prescreened to determine whether the measurement is used to determine the difference matrix. the prescreening is based on whether a sum of diagonal elements of the difference matrix exceeds a first threshold. the prescreening is based on whether a difference between a sum of diagonal elements of the first covariance matrix and a sum of diagonal elements of the second covariance matrix exceeds a second threshold. In some embodiments, the prescreening is based on whether a sum of diagonal elements of the first and second covariance matrices does not exceed a third threshold.

According to yet another aspect, a method in a network node 16 for determining passive intermodulation, PIM, characteristics at the network node 16 is provided. The method includes capturing signals from each of at least one antenna port at a first time and a second time, an antenna port being one of a physical antenna port and a logical antenna port. The method also includes determining a first covariance matrix based on signals captured at the first time. The method also includes determining a second covariance matrix based on signals captured at the second time, the first and second covariance matrices comprising correlation terms, each correlation term being based at least in part on an expected value of a product of signals received from two antenna ports. The method further includes determining a difference matrix, the difference matrix being based on a difference between the first and second covariance matrices, the difference matrix corresponding to changes in PIM between the first time and the second time. The method further includes decomposing at least part of the difference matrix to generate eigenvectors and eigenvalues, the eigenvectors representing a PIM subspace, each eigenvalue corresponding to a change in PIM in a direction indicated by a corresponding eigenvector.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining passive intermodulation, PIM, characteristics at a network node, the method comprising:
    capturing signals from each of a plurality of antenna ports at a first time and a second time;
    determining a first covariance matrix based on signals captured at the first time;
    determining a second covariance matrix based on signals captured at the second time; and
    determining a difference matrix, the difference matrix being based on a difference between the first and second covariance matrices, the difference matrix corresponding to changes in PIM between the first time and the second time.

2. The method of claim 1, further comprising decomposing, at least in part, the difference matrix to generate eigenvectors and eigenvalues, the eigenvectors representing a PIM subspace, each eigenvalue corresponding to a change in PIM in a direction indicated by a corresponding eigenvector.

3. The method of claim 2, wherein the difference matrix has submatrices and the decomposing is of at least a portion of the difference matrix.

4. The method of claim 3, wherein the portion of the difference matrix to be decomposed is determined by a comparison of elements of the difference matrix to at least one threshold.

5. The method of claim 4, further comprising averaging a plurality of difference covariance matrices.

6. The method of claim 5, wherein averages of the difference matrices are weighted averages, at least one of the weights being based at least in part on diagonal elements of the difference covariance matrix.

7. The method of claim 1, wherein a measurement of a signal of the signals is prescreened to determine whether the measurement is used to determine the difference covariance matrix.

8. The method of claim 7, wherein the prescreening is based on whether a sum of diagonal elements of the difference matrix exceeds a first threshold.

9. The method of claim 7, wherein the prescreening is based on whether a difference between a sum of diagonal elements of the first covariance matrix and a sum of diagonal elements of the second covariance matrix exceeds a second threshold.

10. The method of claim 7, wherein the prescreening is based on whether a sum of diagonal elements of the first and second covariance matrices does not exceed a third threshold.

11. An apparatus configured to determine passive intermodulation, PIM, characteristics at a network node, the apparatus comprising processing circuitry configured to:
capture signals from each of a plurality of antenna ports at a first time and a second time;
determine a first covariance matrix based on signals captured at the first time;
determine a second covariance matrix based on signals captured at the second time; and
determine a difference matrix, the difference matrix being based on a difference between the first and second covariance matrices, the difference matrix corresponding to changes in PIM between the first time and the second time.

12. The apparatus of claim 11, further comprising decomposing, at least in part, the difference matrix to generate eigenvectors and eigenvalues, the eigenvectors representing a PIM subspace, each eigenvalue corresponding to a change in PIM in a direction indicated by a corresponding eigenvector.

13. The apparatus of claim 12, wherein the difference matrix has submatrices and decomposing is of at least a portion of the difference matrix.

14. The apparatus of claim 13, wherein the portion of the difference matrix to be decomposed is determined by a comparison of elements of the difference matrix to at least one threshold.

15. The apparatus of claim 14, wherein the processing circuitry is further configured to average a plurality of difference matrices.

16. The apparatus of claim 15, wherein averages of the difference matrices are weighted averages, at least one of the weights being based at least in part on diagonal elements of the difference covariance matrix.

17. The apparatus of claim 11, wherein a measurement of a signal of the signals is prescreened to determine whether the measurement is used to determine the difference matrix.

18. The apparatus of claim 17, wherein the prescreening is based on whether a sum of diagonal elements of the difference matrix exceeds a first threshold.

19. The apparatus of claim 17, wherein the prescreening is based on whether a difference between a sum of diagonal elements of the first covariance matrix and a sum of diagonal elements of the second covariance matrix exceeds a second threshold.

20. The apparatus of claim 17, wherein the prescreening is based on whether a sum of diagonal elements of the first and second covariance matrices does not exceed a third threshold.

21. A method in a network node for determining passive intermodulation, PIM, characteristics at the network node, the method comprising:
capturing signals from each of a plurality of antenna ports at a first time and a second time, each antenna port being one of a physical antenna port and a logical antenna port;
determining a first covariance matrix based on signals captured at the first time;
determining a second covariance matrix based on signals captured at the second time, the first and second covariance matrices comprising correlation terms, each correlation term being based at least in part on an expected value of a product of signals received from two of the plurality of antenna ports;
determining a difference matrix, the difference matrix being based on a difference between the first and second covariance matrices, the difference matrix corresponding to changes in PIM between the first time and the second time; and
decomposing at least part of the difference matrix to generate eigenvectors and eigenvalues, the eigenvectors representing a PIM subspace, each eigenvalue corresponding to a change in PIM in a direction indicated by a corresponding eigenvector.

* * * * *